United States Patent [19]

Hibino

[11] Patent Number: 5,091,798
[45] Date of Patent: Feb. 25, 1992

[54] DIFFRACTION GRATING FOR OPTICAL SCANNING

[75] Inventor: Kenichi Hibino, Tsukuba, Japan

[73] Assignee: Agency of Industrial Science & Technology, Ministry of International Trade & Industry, Tokyo, Japan

[21] Appl. No.: 713,514

[22] Filed: Jun. 12, 1991

Related U.S. Application Data

[63] Continuation-in-part of Ser. No. 498,549, Mar. 26, 1990, abandoned.

[30] Foreign Application Priority Data

Mar. 31, 1989 [JP] Japan ................................. 1-82839

[51] Int. Cl.$^5$ ...................... G02B 5/18; G02B 26/10; G02B 27/44
[52] U.S. Cl. ................................... 359/209; 359/565; 359/569; 359/574; 359/575
[58] Field of Search ........................ 350/3.71, 3.72, 6.2, 350/162.16, 162.2, 162.22, 6.9

[56] References Cited

U.S. PATENT DOCUMENTS 4,832,464  5/1989  Kato et al. ........................ 350/3.72

FOREIGN PATENT DOCUMENTS 60-186805  9/1985  Japan.

Primary Examiner—Bruce Y. Arnold
Assistant Examiner—David R. Parsons
Attorney, Agent, or Firm—Oblon, Spivak, McClelland, Maier & Neustadt

[57] ABSTRACT

A diffraction grating comprises the plurality of grating rings provided at positions such that their radii r are selected so that a function $\phi(r)$ of r satisfies the following differential equation and initial conditions, $$f\lambda\left(\frac{d^2\phi}{dr^2}\right) = \left(\frac{1}{M}\right) \times \left[1 - \left\{\lambda\left(\frac{d\phi}{dr}\right)\right\}^2\right]^{3/2} + \left\{1 - \left(\frac{1}{M}\right)\right\}$$

$\phi(0)$ = specific real number, and $$\frac{d\phi}{dr}(0) = 0$$

where $\lambda$ is the wavelength of a scanning light beam, f is the focal length of the diffraction grating, r is the radius from the center of diffraction grating, M is the distance from the diffraction grating to a scanning surface expressed as a multiple of the focal length f, and moreover the relation $$\phi(r) = n + \phi(0)$$

$n = 0, 1, 2, \ldots$ (n is a non-negative integer)

is satisfied.

1 Claim, 4 Drawing Sheets

DIFFRACTION GRATING FOR OPTICAL SCANNING

REFERENCE TO COPENDING APPLICATION

This application is a continuation-in-part application of my copending application Ser. No. 498,549, now abandoned, filed Mar. 26, 1990.

BACKGROUND OF THE INVENTION

1. Field of the Invention

This invention relates to a diffraction grating for optical scanning in printers which print characters and designs onto a dry plate with a laser or other beam light source as well as bar-code readers.

2. Prior Art Statement

Rotary type diffraction gratings are used in beam-type printers and bar-code readers for guiding the light beam such that it scans across a surface to be scanned.

For example, a bar-code reader is shown in FIG. 1(a). A laser beam source 101 emits a laser beam 102 which passes through a diffraction grating 103 consisting a plurality of concentrically arranged grating elements provided on a disk scanner 110 and strike a bar code 105 placed upon a product 104. Light reflected from the bar code 105 is reflected by a mirror 106 into a photodetector 107, which reads the bar code 105 from the detected light. At this time, the disk scanner 110, radially provided with a plurality of diffraction gratings 103 as seen in FIG. 1(b), rotates about a shaft 108 so that the diffraction grating 103 moves accordingly, thus changing the position at which the laser beam 102a strikes the grating rings of the diffraction grating 103 and altering the direction in which the diffracted beam 102b travels, whereby the diffracted light scans across the entire width of the bar code 105.

The disk scanner described above is subject to the following requirements:

(i) The depth of the scanning spot must not change even if the scanning angle changes. Specifically, the surface over which the spot scans must be a plane.

(ii) The scanning spot must travel in a straight line upon the scanning surface.

(iii) The scanning spot must travel at a constant velocity.

Disk scanners have previously been made as holograms created from a plane wave and a divergent spherical wave, and have thus been known as hologram scanners, but the problem of (i) in particular could not be solved so they were not used in precision applications such as laser printers.

Specifically, as shown in FIG. 2, even though the spot of the diffracted beam 102b focuses exactly on the scanning surface 109 at point $P_1$ in the central portion of the scanning angle $\theta$, at the two extremities of the scanning angle $\theta$, the spot will focus at points on the extensions of points $P_2$ and $P_3$ lying above the scanning surface 109, so accurate reading of the bar code 105 at points on the extension of points $P_2$ and $P_3$ is difficult. Therefore, it is desirable for points $P_2$ and $P_3$ of the beam 102b to also lie in the plane of the scanning surface 109.

To this end, a method known (Japanese Application public Disclosure No. 60-186805) in which a hologram is created by irradiation with a divergent spherical wave light from both sides and then another hologram is created from light from this hologram and divergent spherical wave light and then another hologram is created from light from this hologram and divergent spherical wave light, thus creating a hologram from a plurality of divergent spherical waves.

However, this method is complicated, and hologram are created successively from holograms, so it is difficult to create an accurate hologram.

The present invention came about in light of the above, and its object is to provide a diffraction grating for optical scanning in which the depth of the scanning spot of the light beam will not change even if the scanning angle changes, so therefore the scanning surface of the spot can be planar.

SUMMARY OF THE INVENTION

In order to achieve the above object, in a diffraction grating formed of a pattern of a plurality of grating rings disposed concentrically in a plane, the diffraction grating for optical scanning of the invention comprises grating rings provided at positions such that their radii r are selected so that a function $\phi(r)$ of r satisfies the following differential equation and initial conditions, $$f\lambda\left(\frac{d^2\phi}{dr^2}\right) = \left(\frac{1}{M}\right) \times 1 - \left[\left(\lambda\left(\frac{d\phi}{dr}\right)\right)^2\right]^{3/2} + \left\{1 - \left(\frac{1}{M}\right)\right\}$$

$\phi(0)$ = specified real number, and $$\left(\frac{d\phi}{dr}\right)(0) = 0$$

where $\lambda$ is the wavelength of the scanning light beam, f is the focal length of the diffraction grating, r is the radius from the center of the diffraction grating, M is the distance from the diffraction grating to the scanning surface expressed as a multiple of the focus f, and moreover the relation $\phi(r) = n + \phi(0)$ $n = 0, 1, 2, 3, \ldots$ (n is a non-negative integer)

is satisfied. Note that in the above equation, $$\frac{d\phi}{dr} \text{ and } \frac{d^2\phi}{dr^2}$$

are the first and second derivatives.

If a diffraction grating for optical scanning comprised as such is illuminated perpendicularly to the grating surface by light from a laser or another source of monochromatic light of a small angle of broadening disposed at a distance of $Mf/(M-1)$ (mm) from the grating and regardless of what position on the grating is illuminated, the diffraction grating will transmit (or reflect) the diffracted light such that focus remains at a constant distance of $Mf$ (mm) regardless of the radius r from the center of the diffraction grating, so the surface over which this illuminated spot scans forms a plane.

The above and other features and objects of the invention will become apparent with the following de-

DETAILED DESCRIPTION OF THE PREFERRED EMBODIMENTS

Figure 1A:
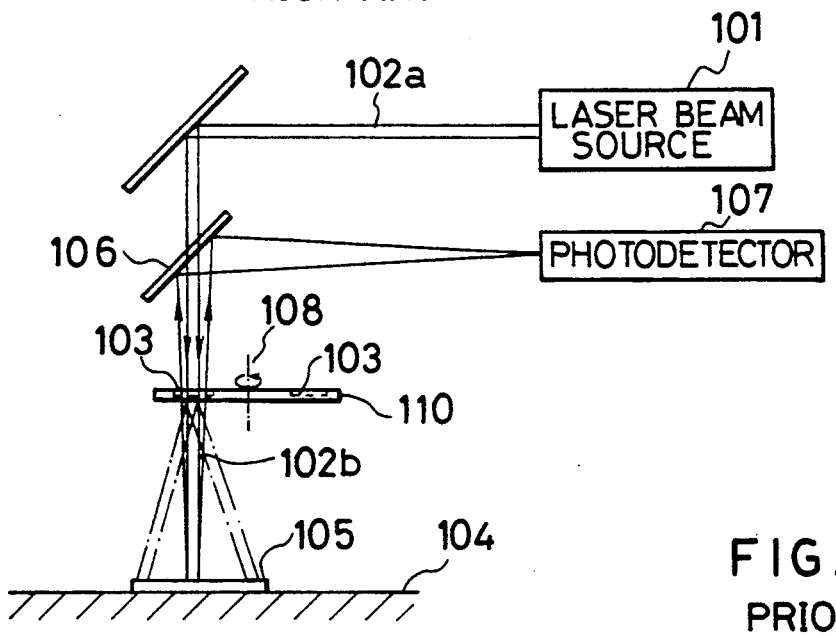
FIG. 1(a) is a structural diagram of a bar-code reader known in the prior art.
Figure 1B:
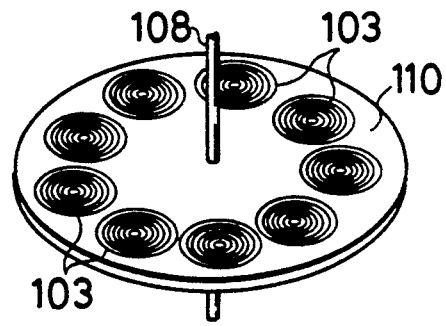
FIG. 1(b) is a perspective view showing one example of a disk scanner used on the bar-code reader shown in FIG. 1(a)
Figure 2:
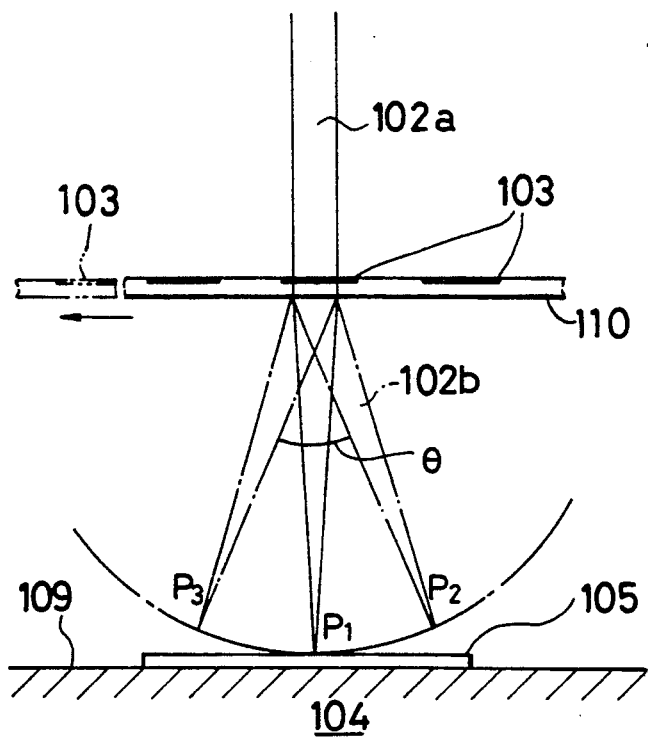
FIG. 2 is an explanatory diagram illustrating the spot position of light diffracted from a conventional diffraction grating.
Figure 3:
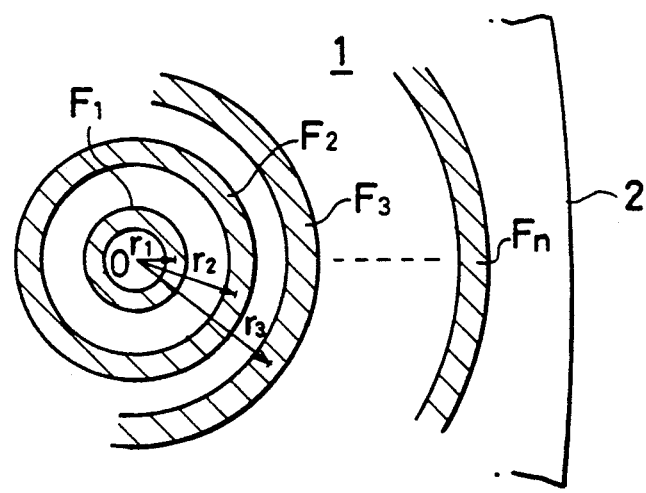
FIG. 3 is an enlarged top view of a diffraction grating according to one preferred embodiment of the invention.
Figure 4:
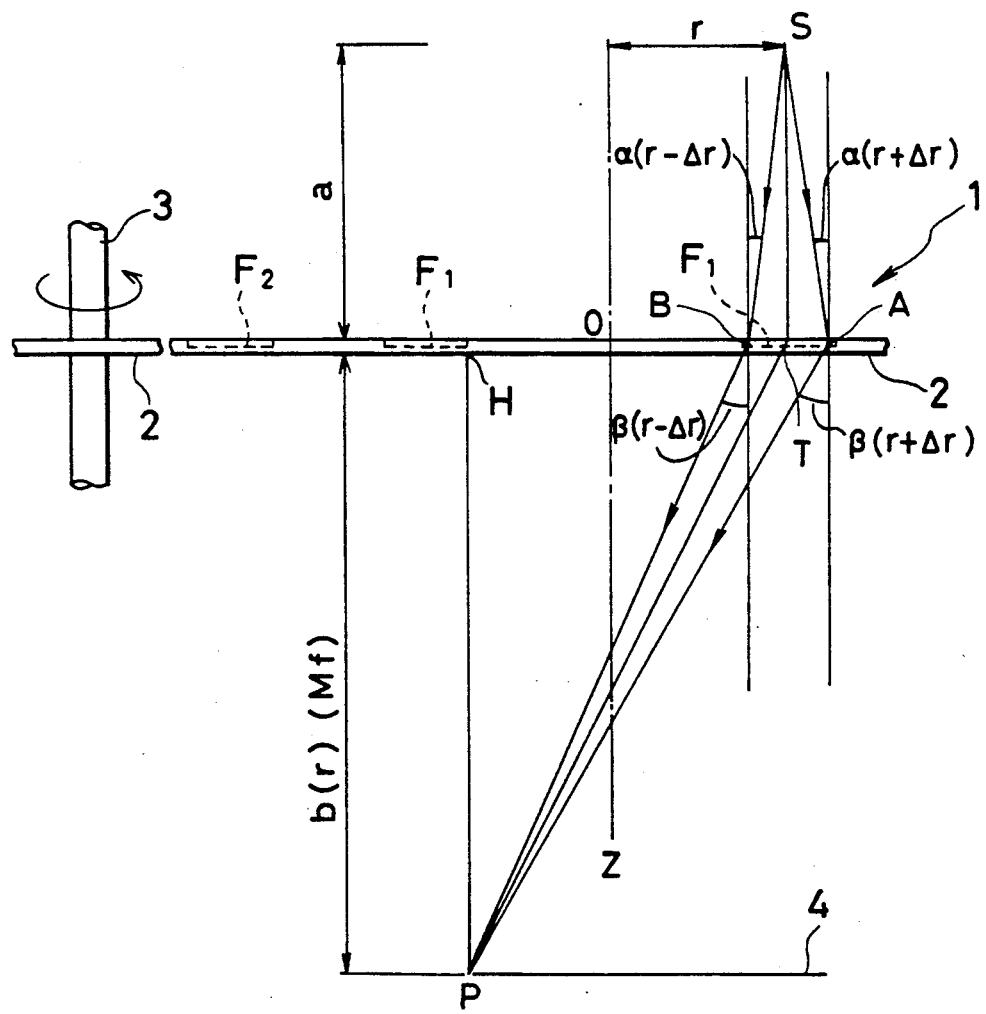
FIG. 4 is a structural diagram of an optical system containing the diffraction grating illustrated in FIG. 3.

In FIG. 3, 1 is one of the diffraction gratings provided on the periphery of the disk scanner 2. The diffraction grating 1 is provided with a given number of grating rings $F_1, F_2, F_3 \ldots F_n$ positioned concentrically about point 0 upon a flat substrate. A plurality of diffraction gratings 1 are disposed along the periphery of the disk scanner 2 as seen in FIG. 1(b). The disk scanner 2 is rotatably supported about a shaft 3 (FIG. 4). The position of each grating line $F_1, F_2, F_3 \ldots F_n$ away from the center O is such that they satisfy the following differential equation and initial conditions, $$f\lambda \left(\frac{d^2\phi}{dr^2}\right) = \left(\frac{1}{M}\right) \times \left[1 - \left\{\lambda\left(\frac{d\phi}{dr}\right)\right\}^2\right]^{3/2} + 1 - \left(\frac{1}{M}\right)$$

$\phi(0)$ = specified real number, and $$\left(\frac{d\phi}{dr}\right)(0) = 0$$

where $\lambda$ is the wavelength of the scanning light beam, f is the focal length of the diffraction grating, r is the radius from the center of the diffraction grating (grating line $F_1$), M is the distance from the diffraction grating (disk scanner 2) to the scanning surface 109 expressed as a multiple of the focus f, and moreover the relation $$\phi(r) = n + \phi(0)$$

$$n = 0, 1, 2, 3, \ldots$$

(n is a non-negative integer is satisfied. Note that in the above equation, $$\frac{d\phi}{dr} \text{ and } \frac{d^2\phi}{dr^2}$$

are the first and second derivatives and $\phi(r)$ is the amount of the phase retardation or optical path difference to be given to the beam incident on the diffraction grating (in wavelength unit $\lambda$), specifically the difference between lengths of TP and HP in FIG. 4.

FIG. 4, which is the partial view of FIG. 3 in section, shows a condition in which light beam is projecting on a part of grating ring $F_1$, one of the grating rings $F_1, F_2 \ldots$, forming the diffraction grating 1, being arranged horizontally viewed in the drawing.

Take O as the center of the diffraction grating 1 and take z-axis optic axis) as an axis perpendicular to a line OA which passes through the center O. Let SAP and SBP the traces of ray respectively, diffracted at the outermost edges of the grating ring $F_1$, when a light beam is projected perpendicularly onto a part of the grating ring $F_1$ from a point S at a distance $a = Mf/(M-1)$ (mm) from the diffraction grating 1.

At this time, the light diffracted by the grating ring $F_1$ is focused at point P on a scanning surface 4. Let r a distance between the light source point S and z-axis and let b(r) the distance from the focal point P to the diffraction grating (disk scanner 2). Then, when distance r between the light source point S and z-axis is varied, the focal point P will also move in a direction parallel to the optic axis. But in the present invention, key feature of the diffraction grating prepared under the foregoing conditions is that, $b(r) = Mf$ represents a constant focusing characteristics irrespective of the distance r. The details will be described as follows.

Assume that $AT = TB = \Delta r$. Let T an intersection between a perpendicular from the point S and the grating line $F_1$ and let H an intersection between a perpendicular from the focus point P and the disk scanner 2. Also let angles formed between SA, SB and z-axis be $\alpha$ $(r + \Delta r)$ and $\alpha$ $(r - \Delta r)$ and let angles formed between AP, BP and z-axis be $\beta$ $(r + \Delta r)$ and $\beta$ $(r + \Delta r)$.

The relationship between the angle of incidence $\alpha$ of the light diffracted by diffraction grating 1 and the angle of diffraction $\beta$ is well known as equation (2), $$\sin\beta \ (r \pm \Delta r) \pm \sin\alpha \ (r \pm \Delta r) = \lambda/g \tag{2}$$

(taking the corresponding sign)

where g (mm) is the spacing between neighboring bands at the point at which the beam crosses the diffraction grating 1 where equation (3)

$$\frac{1}{g} = \frac{d\phi(r)}{dr} \tag{3}$$

holds true. Since in FIG. 4, $$PH\tan\beta \ (r + \Delta r) - PH\tan\beta \ (r - \Delta r) = AH - BH = 2\Delta r$$

holds true, (PH = b(r)), so $$b(r) = \frac{2\Delta r}{\tan\beta \ (r + \Delta r) - \tan\beta \ (r - \Delta r)} \tag{4}$$

which, using equations (2) and (3) gives $$\beta(r \pm \Delta r) = \sin^{-1} \times \lambda \frac{d\phi(r \pm \Delta r)}{dr} \mp \sin\alpha(r \pm \Delta r) \quad (5)$$

Since $f > \Delta r$ under normal usage conditions, $\alpha < 1$ holds true. When $\alpha$ is small, the following approximations $$\alpha \approx \sin\alpha \approx \tan\alpha \approx AT/ST \approx \Delta r/a \quad (6)$$

hold true to good precision. Substituting expression (6) into equation (5) gives an approximation for $\beta(r+\Delta r)$ of $$\beta(r + \Delta r) \approx \sin^{-1} \times \left[\lambda\left\{\frac{d\phi(r+\Delta r)}{dr}\right\} - \left(\frac{\Delta r}{a}\right)\right] \quad (7)$$

while $\beta(r - \Delta r)$ similarly becomes $$\beta(r - \Delta r) \approx \sin^{-1} \times \left[\lambda \, d\phi\frac{(r-\Delta r)}{dr} + \left(\frac{\Delta r}{a}\right)\right] \quad (8)$$

and since $(d\phi/dr)$ is a smooth function, the following approximations holds true.

$$\frac{d\phi(r + \Delta r)}{dr} \approx \frac{d\phi(r)}{dr} + \frac{d^2\phi(r)}{dr^2} \cdot \Delta r \quad (9)$$

$$\frac{d\phi(r - \Delta r)}{dr} \approx \frac{d\phi(r)}{dr} - \frac{d^2\phi(r)}{dr^2} \cdot \Delta r \quad (10)$$

By substituting expressions (9) and (10) into (7) and (8), respectively, and substituting the results of the expression for the calculated angle of diffraction $\beta$ into (4) gives $$b(r) = \quad (11)$$

$$\frac{2\Delta r}{\tan\sin^{-1}\left[\lambda\left(\frac{d\phi(r)}{dr}\right) + \left\{\lambda\left(\frac{d^2\phi(r)}{dr^2}\right) - \left(\frac{1}{a}\right)\right\}\Delta r\right] -}$$

$$\tan\sin^{-1}\left[\lambda\left(\frac{d\phi(r)}{dr}\right) - \left\{\lambda\left(\frac{d^2\phi(r)}{dr^2}\right) - \left(\frac{1}{a}\right)\right\}\Delta r\right]$$

When $X < 1$, $\Delta X < 1$ and $X + \Delta X < 1$, the following approximation holds true.

$$\tan\sin^{-1}(X + \Delta X) - \tan\sin^{-1}(X - \Delta X) \approx \frac{2\Delta X}{(1 - X^2)^{3/2}} \quad (12)$$

where $$X = \frac{d\phi}{dr}$$

$$\Delta X = \lambda\left\{\left(\frac{d^2\phi}{dr^2}\right) - \left(\frac{1}{a}\right)\right\}\Delta r$$

Using this equation, the denominator in (11) may be calculated, giving the equations of (13).

$$b(r) = \frac{\left[1 - \left(\lambda\frac{d\phi(r)}{dr}\right)^2\right]^{3/2}}{\lambda\left\{\left(\frac{d^2\phi(r)}{dr^2}\right) - \left(\frac{1}{a}\right)\right\}} \quad (13)$$

Substituting $a = Mf(M-1)$ and expression (1) of $\lambda$ $(d^2\phi/dr^2)$ into (3) gives $$b(r) = f\frac{\left[1 - \left(\lambda\left(\frac{d\phi}{dr}\right)\right)^2\right]^{3/2}}{\lambda f\left(\frac{d^2\phi}{dr^2}\right) - \left(\frac{f}{a}\right)}$$

$$= f\frac{\left[1 - \left(\lambda\left(\frac{d\phi}{dr}\right)\right)^2\right]^{3/2}}{\left(\frac{1}{M}\right)\left[1 - \left(\lambda\left(\frac{d\phi}{dr}\right)\right)^2\right]^{3/2} + \left(1 - \left(\frac{1}{M}\right)\right) - \left(\frac{M-1}{M}\right)}$$

$$= Mf$$

Therefore the depth $b(r)$ of the focus point is always $Mf$ even if the distance $r$ between the light source $S$ and the z-axis would change.

Figure 5:
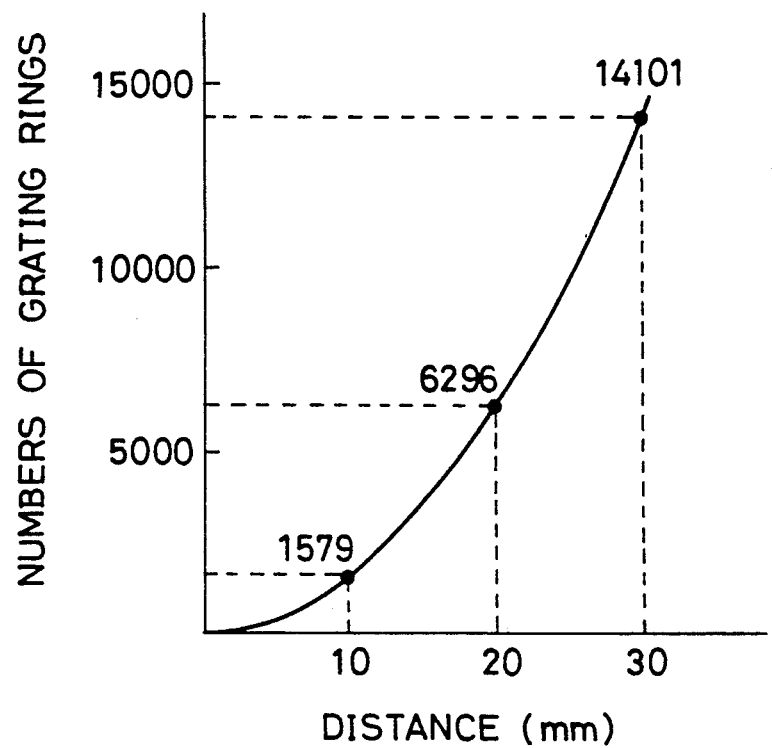
FIG. 5 is a graph showing the relationship between the number of the grating rings and the distance from the center of the diffraction grating of the invention to each grating ring.

The graph of FIG. 5 can be obtained by calculating the positions of the grating rings of the diffraction grating using formula (1) under the conditions that the wavelength $\lambda$ of the scanning beam is 632.8 nm, that the focal distance $f$ of the diffraction grating is 50 mm and that $M = 10$, $\phi(0) = 0$ and $d\phi/dr(0)$. To be specific, by disposing the 1,579th, 6,296th and 14,101st grating rings at positions 10 mm, 20 mm and 30 mm distant from the center $O$ of the diffraction grating, respectively, when a beam is diffracted within the range of specific angles, the diffracted beam is always focused on the scanning surface 4.

Figure 6:
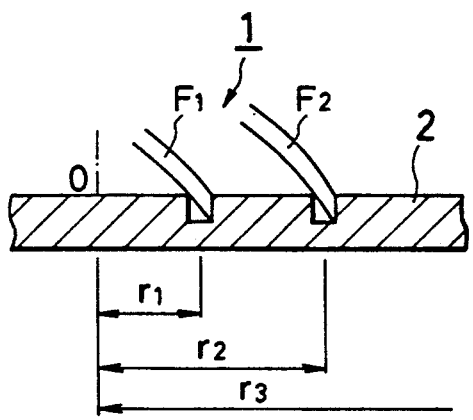
FIG. 6 is an enlarged portion of on preferred embodiment which shows the grating rings for the diffraction grating formed on a disk scanner.
Figure 7:
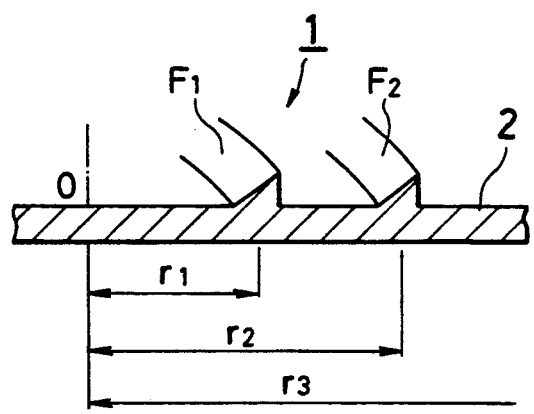
FIG. 7 is an enlarged portion of another preferred embodiment which shows the grating rings for the diffraction grating formed on a disk scanner.

The grating rings $F_1$, $F_2$ and $F_3$ in the diffraction grating 1 may be formed eigher as grooves as shown in FIG. 6 or they may be blazed as shown in FIG. 7.

These types of diffraction gratings may be fabricated by means of one of the following or other methods:

(i) A substrate of glass or other material transparent to light is ground to give a flat surface which is coated with an emulsion which is sensitive to radiation (light or electrons), after which the substrate is rotated while being exposed to a narrowly-focused beam of light (or electrons) at the desired radii.

(ii) A substrate having a film of wax or other light-screening material is rotated while the film is removed at the desired radii with a blade having a sharpened tip.

(iii) A substrate of glass or a crystal material transparent to light ground to give a flat surface is rotated while a lathe cutting tool or other sharp blade is used to cut away the substrate at the desired radii.

(iv) A plotter or other drawing implement is used to draw an enlargement of the required pattern, which is then photographically reduced to obtain the desired pattern.

With the diffraction grating of the invention as described above, regardless of at what position it is illuminated with laser or other scanning light, the light diffracted from the grating forms a spot at a fixed distance of Mf from the diffraction grating, irrespective of the radius r, so the scanning surface of the spot is a plane. Therefore, a bar code or the like on a flat surface can be read accurately. By affixing such a diffraction grating to the edge of a rotating disk, illuminating the diffraction grating from one side by monochromatic light from a fixed position, placing a dry plate coated with a light-sensitive agent at the focus position on the other side, and varying the intensity of the illuminating light while its position on the dry plate changes, the diffraction grating of the invention may be employed in a printer which prints characters or designs by means of the beam of light diffracted from the diffraction grating. In addition, by affixing such a diffraction grating to the edge of a rotating disk, illuminating the diffraction grating from one side by onochromatic light from a fixed position, pacing a bar code at the focus position on the other side, causing the focus to scan across the bar code and detecting the intensity of the reflected light with a photodiode or other photodetector, the diffraction grating of the invention may be employed in a bar-code reader.

Here follows a description of a preferred embodiment of the invention.

A diffraction grating with a focal length (f) of 50 mm and a radius of 30 mm is placed at a distance Mf of 500 mm from the diffraction grating to the scanning surface. The number of grating rings per unit length at various distances from the center of the diffraction grating are listed in Table 1.

TABLE 1

| Distance from center (mm) | 5 | 10 | 15 | 20 | 25 | 30 |
|---|---|---|---|---|---|---|
| Number of grating rings per one wavelength | 0.0999 | 0.1996 | 0.2987 | 0.3969 | 0.4941 | 0.5900 |

In the above, "wavelength" is the wavelength of the light which illuminates the diffraction grating and "Number of grating rings per one wavelength" indicates the number of grating rings present within the width of one wavelength at that radial position. Namely, at a position 5 mm from the center, the spacing between grating rings is about 10 times the wavelength ($\lambda$), while at a position 25 mm from the center, grating rings are provided at a spacing of about 2.024 times the wavelength. For example, if a He-Ne laser having a wavelength of 632.8 nm is used as the light source, the ring density per millimeter at various positions would be as shown in Table 2.

TABLE 2

| Distance from center (mm) | 5 | 10 | 15 | 20 | 25 | 30 |
|---|---|---|---|---|---|---|
| Grating ring density per millimeter | 157.9 | 315.4 | 472.0 | 627.2 | 780.8 | 932.3 |

Next, three scanners were prepared: scanner I employing as its diffraction grating a hologram prepared in the known manner from a plane wave and a divergent spherical wave, scanner II employing as its diffraction grating a hologram prepared from a plurality of spherical waves as disclosed in Japanese Patent Application Public Disclosure No. 60-186805, and a scanner employing the diffraction grating manufactured by the method of this invention. Table 3 lists, for each scanner, the differential equations with respect to the phase $\phi$ which determines the radia location of grating rings. In the table, the replacement $$\lambda \frac{d\phi}{dr} = y$$

is used.

TABLE 3

| This invention | $f \frac{dy}{dr} = \frac{1}{M}(1 - y^2)^{3/2} + \left(1 - \frac{1}{M}\right)$ |
|---|---|
| Scanner (I) | $f \frac{dy}{dr} = (1 - y^2)^{3/2}$ |
| Scanner (II) | $f \frac{dy}{dr} = \left(1 - \frac{y^2}{N^2}\right)^{3/2}$ |

(N is a natural number)

Figure 8:
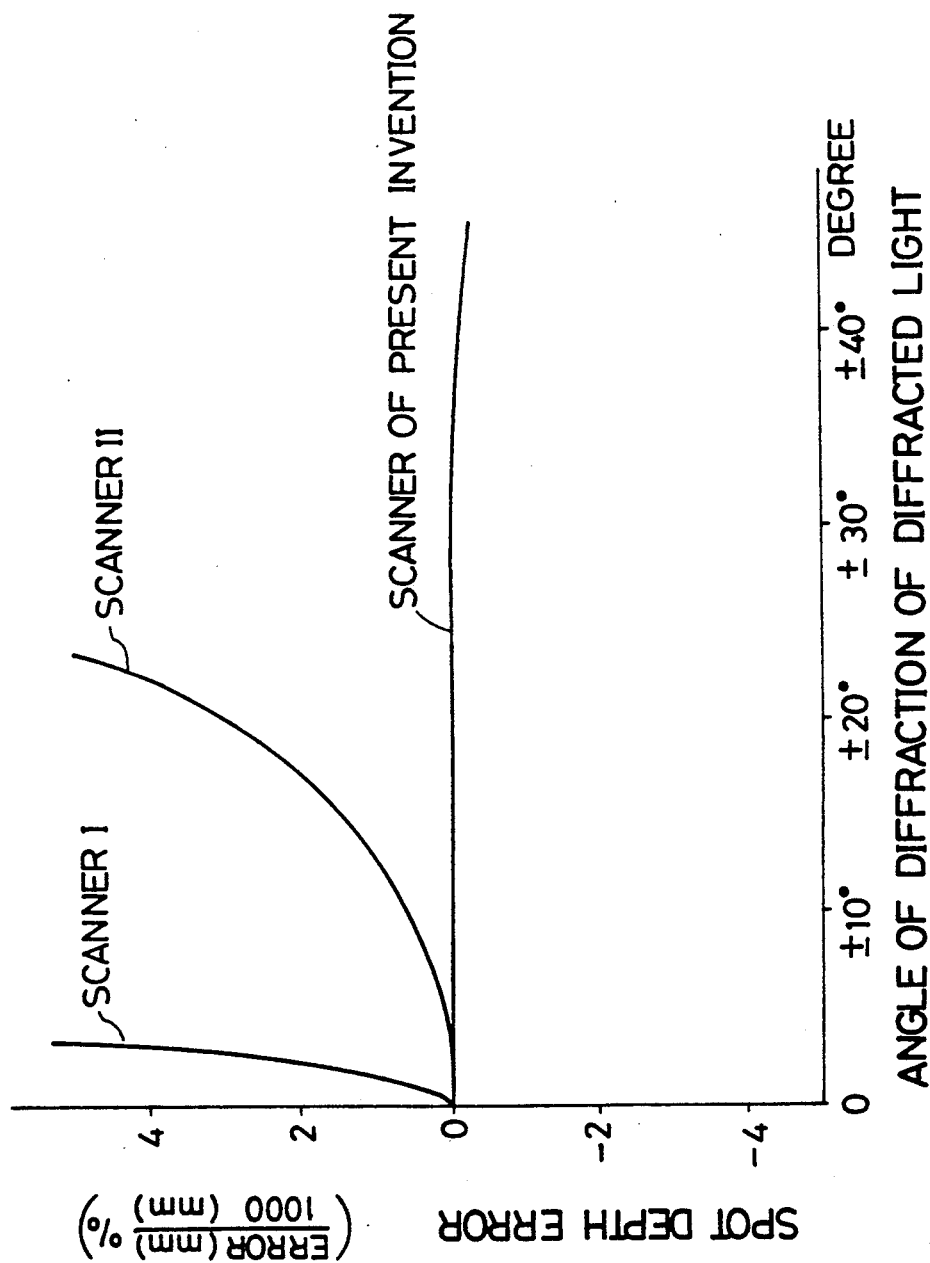
FIG. 8 is a graph of depth error as a function of the angle of diffraction for the diffraction grating of the invention.

Substituting values of: 100 mm as the focal length (f), 1,000 mm as the distance from the diffraction grating to the scanning surface, 633 nm as the wavelength ($\lambda$) of the laser light used, and 0.2 mm as the diameter of the spot of laser light, into the equations of Table 3 and carrying out the calculations gives a graph as shown in FIG. 8.

In the graph of FIG. 8, the angle of diffraction of the light is on the x-axis and the depth error of the scanning spot is on the y-axis. As is apparent from the graph, virtually no depth error was apparent for the scanner of the invention even at the angle of diffraction of 40°. Note that 3 was used as N in the equation for scanner II and 1 was used as M in the equation for the scanner of the invention.

What is claimed is:

1. A diffraction grating system for optical scanning, comprising:
   a plurality of diffraction gratings arranged on a peripheral edge portion of a disk scanner, each of said plurality of diffraction gratings further comprising:
   a plurality of grating rings disposed concentrically in a plane,
   said plurality of grating rings being provided at positions such that their radii r are selected so that a function $\phi(r)$ of r satisfies the following differential equation and initial conditions, $$f\lambda \left(\frac{d^2\phi}{dr^2}\right) = \left(\frac{1}{M}\right) \times \left[1 - \left\{\lambda\left(\frac{d\phi}{dr}\right)\right\}^2\right]^{3/2} +$$

$$\left\{1-\left(\frac{1}{M}\right)\right\}$$

φ(0) = specific real number, and $$\frac{d\phi}{dr}(0) = 0$$

where λ is the wavelength of a scanning light beam, f is the focal length of each said diffraction grating, r is the radius from the center of each said diffraction grating, M is the distance from each said diffraction grating to a scanning surface expressed as a multiple of the focal length f, and moreover the relation φ(r) = n + φ(0)

n = 0, 1, 2, 3, . . .

(n is a non-negative integer)

is satisfied.

* * * * *